June 18, 1935.  C. E. RIDGWAY  2,005,594
LINER FOR FRUIT BOXES
Filed Oct. 15, 1932  3 Sheets-Sheet 1
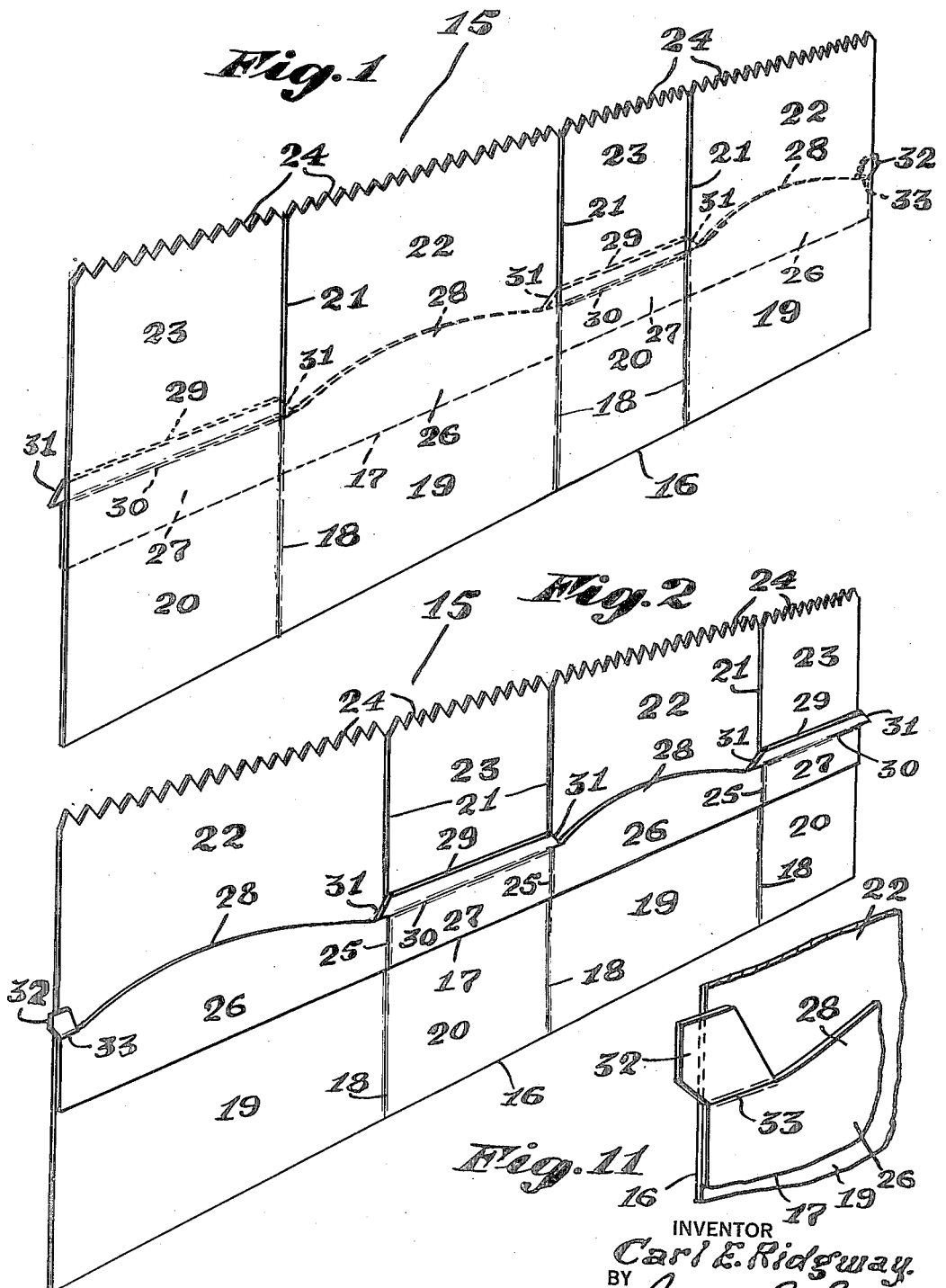
INVENTOR
Carl E. Ridgway.
BY James E. Sproll
ATTORNEY

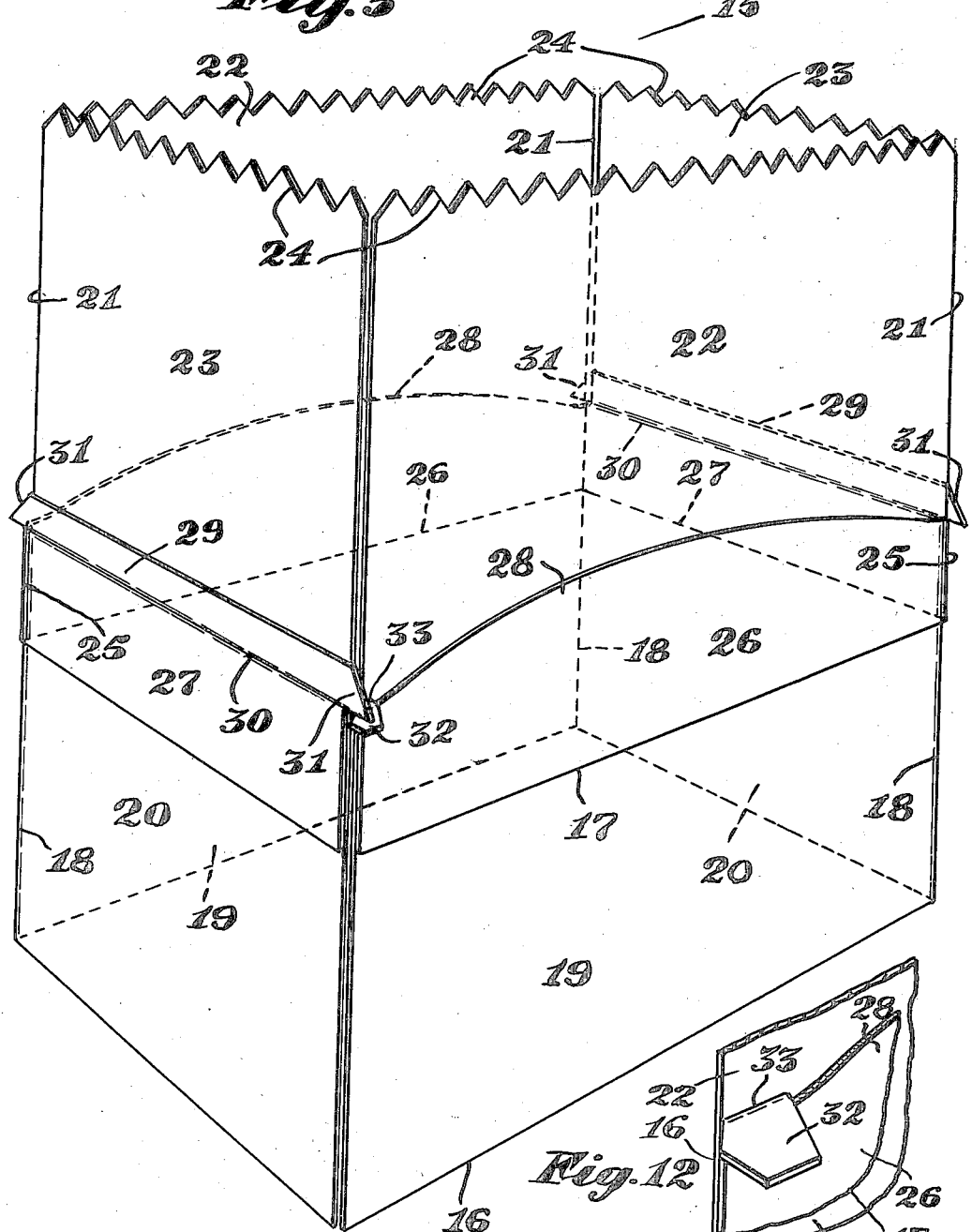

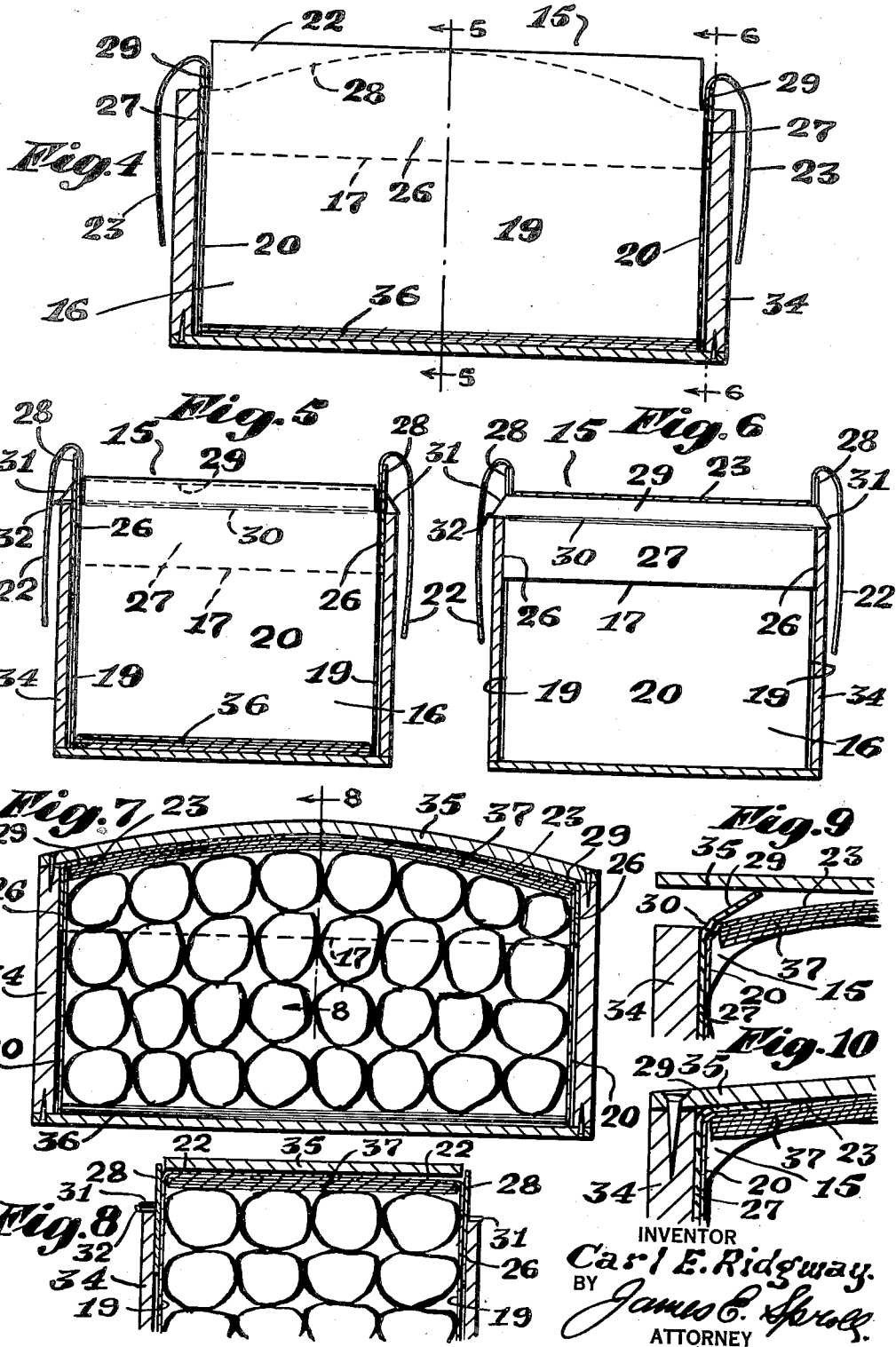

Patented June 18, 1935

2,005,594

UNITED STATES PATENT OFFICE 2,005,594

LINER FOR FRUIT BOXES

Carl E. Ridgway, Seattle, Wash.

Application October 15, 1932, Serial No. 637,941

9 Claims. (Cl. 217—3)

This invention relates to liners for fruit boxes, or the like, and aims primarily to provide a cheap and highly efficient liner for a fruit box, especially designed and particularly adapted to positively prevent edge cutting and friction bruising, wrinkle marking and alkali burning or discolorations of the packed fruit during packing, storage and shipment of the same.

Contemplated by the present invention is a liner for a fruit box, or the like, comprising an elongated liner sheet of relatively thin flexible material which is adapted to snugly fit within the fruit box and to extend completely around the same and over the packed fruit; a protective or reinforcing collar attached to said liner sheet having curvilinear and rectilinear flanges formed thereon, respectively, adapted to compensate for the crown pack of the fruit and to prevent edge cutting of the same during lidding of the fruit box; and means for supporting the liner within the fruit box during packing operations; all of which features are to be correlated in the broad aim of enhancing the efficiency of the present liner for the uses and purposes for which the same is primarily designed and intended.

The above, and additional objects which will hereinafter be more specifically treated are attained by such means as are shown in the accompanying drawings, described in the following specification and then more clearly pointed out in the claims, which are appended hereto and form part of this application.

With reference to the drawings, in which there is illustrated one embodiment of the invention, and throughout the several views of which like characters of reference designate similar parts:

Figure 1 is a perspective view of a liner or pad for fruit boxes comprehended by the present invention, taken from the inner side thereof and as it would appear in an extended or developed state.

Fig. 2 is a similar view of said liner taken from the outer side thereof.

Fig. 3 is a perspective view of the liner, as it would appear when assembled and ready for insertion in a fruit box.

Fig. 4 is a vertical longitudinal section of a fruit box equipped with the liner of the present invention, as it would appear prior to being packed with fruit.

Figs. 5 and 6, are vertical transverse sections taken through 5—5 and 6—6, respectively, of Fig. 4.

Fig. 7 is a vertical longitudinal section of a fruit box equipped with the liner of the present invention, as it would appear after being packed with fruit and lidded.

Fig. 8 is a fragmentary transverse vertical section taken through 8—8 of Fig. 7.

Fig. 9 is an enlarged fragmentary vertical longitudinal section of one end of the fruit box and its lid or cover, illustrating more clearly the fruit protective action of the collar of the liner, as the lid is being attached to the box.

Fig. 10 is a similar section of the same illustrating more clearly the manner in which the collar of the liner functions to obviate edge cutting bruises of the packed fruit.

Fig. 11 is an enlarged fragmentary perspective view of the collar terminal of my improved liner, illustrating more clearly the creased supporting lip or tab for the free side wall of the liner, as it would appear prior to its being flexed or bent outwardly to support said free side wall, and Fig. 12 is a similar view of said collar terminal and lip, as it would appear with said lip flexed or bent outwardly to rest upon the upper edge of the side wall of the fruit box, to support the free side wall of the liner thereat.

Beginning now the more detailed description of the invention by reference to the accompanying drawings, the numeral 15 generally designates my novel and improved liner for a fruit box, which when operatively disposed within the latter is adapted to extend completely around the same, and as now constructed comprises a single liner sheet 16 and a protective or reinforcing collar 17.

In the instant construction, the liner sheet 16 is preferably fabricated in the elongated rectangular formation illustrated in Figs. 1 and 2 from relatively thin and flexible sheet material, such as a good grade of extra smooth highly finished paper, or other similar material, with its inner face or side waxed or paraffined to provide an exceptionally smooth and lubricated fruit contacting surface for the liner, and thereby effectually and positively prevent friction bruising or abrasion of the packed fruit, inasmuch as, the wax or paraffine of the fruit contacting surface of the liner sheet 16 together with the natural wax of the packed fruit form and provide a lubricant between the liner sheet and the fruit, more especially when the latter becomes loosened in its box due to shrinkage while in storage. Hence, it will be manifest and apparent from the foregoing, that friction bruising of the packed fruit cannot occur during handling and shipping of the same. Further, by providing such exceptionally smooth waxed or paraffined surface for contacting the packed fruit no wrinkle marking of the same can or does occur, for the reason that, the wax or paraffine effectually prevent the liner sheet from becoming wrinkled in handling. However, while I have herein described the liner sheet 16, as being provided with a waxed or paraffined fruit contacting surface I desire to have it understood, that I herein reserve the right to wax or paraffin such fruit contacting surface or leave the latter unwaxed or untreated, as I find the same necessary or deem it most expedient.

To facilitate and expedite the insertion and proper positioning of the liner 15 within its correlated fruit box, as well as to insure of the same snugly fitting therein, I form and provide, at suitably spaced intervals, in the lower half portion of the liner sheet 16, a series of vertically disposed creases 18, which creases divide said liner sheet 16 into longitudinally disposed lining portions 19 for the sides of the fruit box and transversely disposed lining portions 20 for the ends of the fruit box. In the present instance the upper half portion of the liner sheet 16 is formed and provided with a series of vertically disposed slits 21, which latter are disposed in vertically aligned relation with the creases 18, and divide said upper half portion of the liner sheet 16 into longitudinally disposed curtains 22 and laterally disposed curtains 23, see Fig. 3, which are adapted to fold upon and cover the packed fruit, said curtains having their upper edges preferably scalloped or serrated, as at 24, to provide a more finished appearance therefor.

Referring now to the protective or reinforcing collar 17 of the liner 15 for a more detailed description of the same, said collar is preferably fabricated, in the relatively narrow elongated formation illustrated in Figs. 1 and 2, from comparatively stiff material, such as, heavy cardboard, or the like, and in the present instance is longitudinally disposed upon the liner sheet 16 to extend the entire length thereof at a point thereon substantially midway the height of same, preferably at the junctures of the creases 18 with the slits 21, see Figs. 1 and 2, such collar 17 being attached or affixed to its correlated liner sheet 16, as by gluing the same thereto, or in any other approved or desired manner. In this connection, I desire to state that when glue is used to attach the collar 17 to the sheet 16, that such glue is of the finest vegetable variety obtainable, and contains no silicate of soda, water glass, or other alkali substances, thereby obviating and eliminating alkali burns on or discolorations of the packed fruit. Formed and provided on the collar 17, in aligned relation with the creases 18 and slits 20 of the liner sheet 16, are a series of vertically disposed creases 25, which creases divide the collar 17 into longitudinally disposed portions 26 for the sides of the fruit box and transversely disposed portions 27 for the ends of the fruit box, it being here noted that the portions 26 of the collar 17 are disposed in aligned relation with the portions 19 of the liner sheet 16, while the portions 27 of said collar are disposed in similar relation with the portions 20 of said sheet. Integrally formed upon the upper edges of the portions 26 are curvilinear flanges 28 and similarly formed upon the portions 27 are rectilinear flanges 29, which flanges are adapted to extend above the plane of the upper edge of the fruit box when the liner 15 is operatively positioned therein, in a manner and for a reason and purpose which will shortly be made more apparent. Formed and provided upon the collar 17, coextensive with the rectilinear flanges 29 and intermediately of said flanges and their correlated portions 27, are creases 30, this for the purpose of facilitating and expediting the inward flexing or bending of the rectilinear flanges 27 when the fruit box is being lidded. The longitudinally disposed curvilinear flanges 28, as hereinbefore stated, extend above the plane of the upper edge of the fruit box, this in order to compensate for the crown pack of the fruit, which causes a bulging of the lid of the fruit box and in consequence ordinarily leaves longitudinal openings or spaces between the lid and the top edges of the box sides, and were it not for the protection afforded by the flanges 28, which normally close said openings, the packed fruit adjacent the latter would be exposed to injury and damage. In this connection, it may be well to state at this point, that fruit boxes of the type herein described are ordinarily piled upon their sides, rather than their tops and bottoms, during storage or shipment, which fact materially increases the danger of damage to the fruit in boxes not provided with the curvilinear flanges 28, hence, were it not for the latter closing the openings formed by the crown packing of the fruit, the top layer of the latter at the sides of the box would be grooved or creased from pressure or friction against the box sides and box lid, or by objects penetrating the box through such openings. The creased transversely disposed rectilinear flanges 29 are only adapted to extend above the plane of the upper edge of the box during the packing of the latter, this in order to prevent the packed fruit rolling out of the box, while the latter is travelling upon a conveyor between the packer and the lidder, however, the primary aim and object of such flanges is to prevent edge cutting of the packed fruit during lidding of the box, this by reason of the fact that these flanges are flexed or bent inwardly before or while the box is being lidded, substantially in the manner illustrated in Figs. 9 and 10, thus protecting the top layer of fruit adjacent the end walls and lid of the box and positively and effectively preventing edge cutting of the same by such end walls and lid.

The liner sheet 16 being fabricated from relatively thin and flexible sheet material, as hereinbefore described, requires external support when the same is inserted within the fruit box, to thereby maintain it in proper position therein while the box is being packed, and for this purpose I provide the rectilinear flanges 29 with terminal lugs or ears 31, which are integrally formed thereon and extend therefrom in prolongation thereto to rest upon the upper edge of the fruit box adjacent the corners thereof, see Figs. 3, 5, 6 and 8, and in addition to such lugs or ears I provide a tab or lip 32 upon the free terminal of one of the curvilinear flanges 28 to support the correlated free side 19 of the liner sheet 16, see Fig. 3, said tab or lip 32 being integrally formed upon said flange 28 at the upper free corner thereof, see Fig. 11, and is provided with a longitudinally disposed crease 33, to facilitate the outward bending or flexing of the same, see Figs. 3 and 12, whereby such tab is adapted to rest upon the upper edge of the fruit box and thereby support the free side 19 of the liner sheet 16, as will be manifest and apparent. It being here noted that the outward bending or flexing of the tab 32 is automatically effected by the adjacent lug 31 of the free rectilinear flange 29, while the liner 15 is being inserted within the fruit box, and following such flexing or bending of the tab 32 by said lug 31, the latter is adapted to rest or bear upon and maintain or retain said tab in contact with the upper edge of the box, see Figs. 3, 5, 6 and 8.

Before passing from a detailed description of the collar 17, I desire to state, that such collar is formed or fabricated from a single strip of sheet material, and that the curvilinear flanges 28 and rectilinear flanges 29 thereof are alternately and successively formed thereon and concurrently therewith the material of said strip is slitted to form the lugs 31 and cut to form the tab 32, all in a single operation.

In Figs. 4 to 10, inclusive, the numeral 34 designates a conventional fruit box of the type ordinarily employed for packing and shipping apples, pears, or the like, and 35 the lid or cover of the same, which box is illustrated as lined with my novel and improved liner 15.

In the operation of lining and packing the fruit box 34, the operator first flexes or bends the liner 15 at the creases 18 and 25, then inserts the liner within the box with its portions 19 and 20 in abutment with the side and end walls thereof, at which time the creases 18 and 25 are disposed in snugly fitting relation within their respective corners of the box, and three of the lugs 31 are in contact with and resting upon the upper edges of the latter, while the fourth lug 31 on the free terminal section 27 of the collar 17, which has previously and automatically flexed or bent the tab 32 on the free terminal section 26 outwardly, during the insertion of the liner 15 within the box, is in contact with and resting upon said tab. Following the insertion of the liner 15 within the box 34, the operator folds the curtains 22 and 23 outwardly so that the same hang downwardly outside of the box along the ends and sides of same during the packing operation, see Figs. 4, 5 and 6, following which a bottom liner or pad 36, of any well known type, is inserted within the box, whereupon the latter is ready to be packed with fruit. Upon completion of the fruit packing operation, which is performed in the well known crown pack manner illustrated in Figs. 7 to 10, inclusive, a top liner or pad 37 is placed upon the packed fruit, following which the curtains 22 and 23 are folded thereupon, after which the packed fruit box is ready for the lidding operation, which latter may be performed either by hand or in a lidding machine, in either case, the rectilinear flanges 29 are flexed or bent inwardly and downwardly before or while lidding, substantially in the manner illustrated in Figs. 9 and 10, which flexing or bending of the flanges 29 may also be done either manually or mechanically, depending on whether the fruit box 34 is lidded by hand or by machine. With the flanges 29 flexed inwardly and downwardly in the manner shown and just described and with the lid or cover 35 in proper position upon its correlated box 34, said lid is then fixedly secured to the latter, whereupon the packed fruit box is then ready for storage or shipment.

Manifestly, therefore, the liner of the present invention is extremely simple, compact, durable and economical in construction, is reliable and efficient in use, will positively and definitely insure of the packed fruit arriving at its destination free from edge cutting and friction bruises, also free from markings due to wrinkled liners, and also free from alkali burns and discolorations.

While I have herein shown and described the invention with sufficient detail to enable those skilled in the art to which it pertains to understand the mode of construction and the principles involved, it is to be understood that there is no intentional limitation herein to the specific form and precise details of construction shown and described, except as expressly defined by the appended claims, and that various modifications of the same may be resorted to without departing from the spirit of the invention or the benefits derivable therefrom. It is also to be understood that certain features of the invention herein disclosed may be employed in other combinations than those shown and described.

Having thus fully described my invention, what I claim as new and desire to secure by Letters Patent is:—

1. A liner for a fruit box comprising a liner sheet, a reinforcing collar attached to said liner sheet, and means carried by said collar for supporting the liner sheet within the fruit box while the same is being packed.

2. A liner for a fruit box comprising a liner sheet, a reinforcing collar attached thereto, said sheet and collar being jointly and vertically creased at intervals whereby the same are adapted to snugly fit within the corners of the fruit box, and means carried by said collar for supporting the liner within the fruit box while the latter is being packed.

3. A liner for a fruit box comprising a liner sheet, a reinforcing collar attached thereto, said sheet and collar being adapted to extend completely around the inner walls of the fruit box, and means carried by said collar adapted to rest upon the upper edges of the fruit box for supporting the liner therein during packing thereof.

4. A liner for a fruit box comprising a liner sheet, a reinforcing collar attached thereto having inwardly foldable flanges adapted to extend along the ends of said box and above the plane of the upper edges thereof while the fruit box is being packed, said flanges being adapted to fold within said fruit box when the same is being lidded to thereby prevent edge cutting of the fruit, and means carried by said collar for supporting the liner within the fruit box during packing of the latter.

5. A liner for a fruit box comprising a liner sheet, a reinforcing collar attached thereto having flanges adapted to normally extend along the sides of the fruit box and above the plane of the upper edges thereof, and also having inwardly foldable flanges adapted to extend along the ends of said box and above the plane of the upper edges thereof while the fruit box is being packed, said flanges being adapted to fold within said fruit box when the same is lidded to thereby prevent edge cutting of the fruit, and means carried by said collar for supporting the liner within the fruit box during packing of the latter.

6. A liner for a fruit box comprising a liner sheet, a reinforcing collar attached thereto, said sheet and collar being adapted to extend completely around the inner walls of the fruit box, oppositely disposed flanges upon the upper edge of said collar adapted to normally extend along the sides of the box and above the plane of the upper edges thereof, other oppositely disposed inwardly foldable flanges upon the upper edge of said collar adapted to extend along the ends of said box and above the plane of the upper edges thereof while the fruit box is being packed, said last mentioned flanges being adapted to fold within the fruit box when the same is being lidded to thereby prevent edge cutting of the fruit, and terminal lugs on said flanges adapted to normally rest upon the upper edges of the fruit box to support the liner therein during packing of said fruit box.

7. A liner for a fruit box comprising a liner sheet, a reinforcing collar attached thereto, said sheet and collar being adapted to extend completely around the inner walls of the fruit box and being jointly and vertically creased to snugly fit within the corners of the same, oppositely disposed curvilinear flanges formed upon the upper edge of said collar adapted to normally extend along the sides of the fruit box and above the plane of the upper edges thereof, other oppositely disposed inwardly foldable rectilinear flanges formed upon the upper edge of said collar having creases co-extensive therewith for facilitating inward folding thereof, said flanges being adapted to extend along the ends of said box and above the plane of the upper edges thereof while the fruit box is being packed and being also adapted to fold within said fruit box when the same is being lidded to thereby prevent edge cutting of the fruit, terminal lugs integrally formed on and extending from said rectilinear flanges, and a tab similarly formed upon one of said curvilinear flanges, said lugs and tab being adapted to normally rest upon the upper edges of the fruit box to support the liner therein during packing of said fruit box.

8. A liner for a fruit box adapted to extend completely around the inner walls thereof and comprising a relatively wide liner sheet of elongated rectangular formation, a reinforcing collar of relatively narrow elongated formation attached to said liner sheet substantially midway its height and extending the length of the same, the lower half portion of said sheet being jointly and vertically creased with said collar to snugly fit within the corners of the fruit box, a series of curtains formed in the upper half portion of said liner sheet adapted to be folded upon the packed fruit, oppositely disposed curvilinear flanges integrally formed upon the upper edge of said collar adapted to normally extend along the sides of the fruit box and above the plane of the upper edges thereof, other oppositely disposed inwardly foldable rectilinear flanges similarly formed upon the upper edge of the collar having creases co-extensive therewith for facilitating inward folding thereof, said flanges being adapted to extend along the ends of said box and above the plane of the upper edges thereof while the fruit box is being packed and being also adapted to fold within said box when the same is being lidded to thereby prevent edge cutting of the fruit, terminal lugs integrally formed upon and extending outwardly from said rectilinear flanges, and a creased tab similarly formed upon the free terminal of one of said curvilinear flanges adapted to be automatically and outwardly flexed by one of said terminal lugs while the liner is being inserted within the fruit box, said lugs and tab being adapted to normally rest upon the upper edges of the fruit box to support the liner therein during the packing of same, with the tab flexing lug resting upon the flexed tab to retain the same in contact with the upper edge of the fruit box.

9. The combination with a liner for a fruit box, of a relatively narrow reinforcing collar therefor fabricated from comparatively heavy material, a series of curvilinear and rectilinear flanges formed upon one edge thereof in alternate relation, a liner supporting tab integrally formed upon the free terminal of one of said curvilinear flanges, and liner supporting terminal lugs integrally formed upon said rectilinear flanges.

CARL E. RIDGWAY.